UNITED STATES PATENT OFFICE 2,568,296

REACTION OF ENOL ESTERS WITH ALKOXY-CARBOXYLIC ACID ANHYDRIDES

Benjamin Phillips, Jr., Charleston, W. Va., assignor, by mesne assignments, to Union Carbide and Carbon Corporation, a corporation of New York No Drawing. Application July 28, 1948,
Serial No. 41,178

14 Claims. (Cl. 260—484)

This invention relates to the production of enol esters by the reaction of the carboxylic acid ester of the enolic form of a ketone with an anhydride of an alkoxycarboxylic acid, as in the synthesis of isopropenyl beta-alkoxy propionate from isopropenyl propionate and beta-alkoxypropionic anhydride.

It is known that an aldehyde or ketone may form an enol ester characterized by the grouping

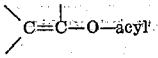

and for the preparation of certain enol esters it has been proposed to acylate with acetic anhydride, as for instance in the production of acetoxybutadiene, $CH_2=CHCH=CHOCOCH_3$, from crotonaldehyde and acetic anhydride, in the presence of a large amount of sodium acetate. The reaction is of limited applicability and usefulness. It is not at all a general reaction for ketones, and where a reaction does take place the yields and efficiencies are usually poor, as with crotonaldehyde. It has also been proposed to acylate with an acid chloride, but the use of an acid chloride such as benzoyl chloride, for instance, is attended by poor yields and problems of corrosion. Ketene is a useful reagent for the preparation of enol acetates, but since the homologs and derivatives of ketene are not available, a similar method is unavailable for the preparation of esters of higher acids.

This invention is based on the discovery that a carboxylic ester of the enol form of a ketone can be converted to the ester of an alkoxycarboxylic acid by reacting the enol ester with the alkoxycarboxylic acid anhydride corresponding thereto. The overall result of the reaction is an interchange of acyl groups between the alkoxycarboxylic acid anhydride and the enol ester which is the starting material, with the acyl group of the enol ester being displaced by an alkoxyacyl group from the anhydride. The acyl group displaced from the enol ester apparently enters the anhydride molecule to form a mixed acid anhydride. The reaction appears to be a general one for enol esters, and alkoxycarboxylic anhydrides, as classes; and hence of broad applicability as illustrated by the following equation:

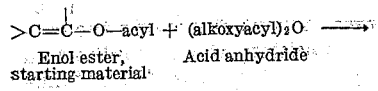

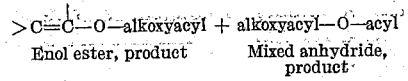

The present invention provides a convenient and economical way of obtaining enol esters of alkoxyacyl esters which heretofore were not readily obtainable in good yields and efficiencies as far as is known, if obtainable at all. When isopropenyl acetate and beta-ethoxypropionic anhydride, for instance, are reacted, the products are isopropenyl beta-ethoxypropionate and the mixed acetic-ethoxypropionic anhydride. Usually it will be found more convenient to decompose the mixed anhydride than to isolate it. The mixed beta-ethoxypropionic acetic anhydride can be converted to acetic anhydride and to beta-ethoxypropionic anhydride. In the practice of the invention the beta-ethoxypropionic anhydride, thus formed from the mixed anhydride, can be returned to the process, and the acetic anhydride can be reacted with beta-ethoxypropionic acid for the preparation of beta-ethoxypropionic anhydride for use in the process. A similar cycle of steps can be employed for other alkoxycarboxylic anhydrides. Furthermore, the process can be carried out in ordinary equipment as compared with the equipment suitable for other processes requiring a reaction pressure above atmospheric pressure or using corrosive materials in the reaction mixture.

If, instead of the anhydride, the carboxylic acid is used as the starting material, the enol ester first reacts with the carboxylic acid to form a carboxylic anhydride, and this anhydride then reacts with more of the enol ester in accord with the process of the invention as previously described. When isopropenyl acetate, for instance, is heated with beta-ethoxypropionic acid in the presence of sulfuric acid as catalyst, the two react to form acetone and the mixed anhydride of acetic acid and beta-ethoxypropionic acid. If more than one mol of isopropenyl acetate per mol of beta-ethoxypropionic acid is used, the amount in excess of one mol then reacts with the mixed anhydride to give acetic anhydride and the desired isopropenyl beta-ethoxypropionate.

Anhydrides that can be reacted with enol esters in accord with the process of the present invention are those in which the alkoxyacyl groups contain up to ten carbon atoms with at least two carbon atoms present in the acyl group to which the alkoxy group is attached. In other respects the acyl group of the anhydride can be open chain or cyclic, saturated or unsaturated, aromatic or aliphatic including cycloaliphatic.

Suitable alkoxycarboxylic acid anhydrides include, by way of illustration, the anhydrides of the alpha-methoxy and alpha-ethoxy derivatives of acetic, propionic, butyric and 2-ethylhexoic acids; the anhydrides of the alpha-propoxy, alpha-isopropoxy, alpha-butoxy, and alpha-cyclohexoxy derivatives of acetic, propionic and butyric acids; the anhydrides of the beta-methoxy, beta-ethoxy, beta-propoxy, beta-isopropoxy, and beta-cyclohexoxy derivatives of propionic and butyric acids; para-methoxybenzoic anhydride, 4-methoxycyclohexane carboxylic acid and the like.

Enol esters which can be converted into esters of alkoxy carboxylic acids include the acetic, propionic, butyric, pentanoic, hexanoic, heptanoic, octanoic, nonanoic, decanoic, lauric, myristic, palmitic, margaric, stearic, acrylic, crotonic, angelic, pentenoic, hexenoic, oleic, linoleic, linolenic, cyclohexanoic, sorbic or the like ester of the enolic form of such ketones as acetone, $CH_3COCH_3$; methyl ethyl ketone, $$CH_3COC_2H_5$$

methyl propyl ketones, $CH_3COC_3H_7$; methyl butyl ketones, $CH_3COC_4H_9$; methyl pentyl ketones, $CH_3COC_5H_{11}$; methyl hexyl ketones, $$CH_3COC_6H_{13}$$

methyl heptyl ketones, $CH_3COC_7H_{15}$; methyl octyl ketones, $CH_3COC_8H_{17}$; methyl nonyl ketones, $CH_3COC_9H_{19}$; methyl decyl ketones, $$CH_3COC_{10}H_{21}$$

diethyl ketone, $C_2H_5COC_2H_5$; ethyl propyl ketones, $C_2H_5COC_3H_7$; ethyl butyl ketones, $$C_2H_5COC_4H_9$$

ethyl pentyl ketones, $C_2H_5COC_5H_{11}$; ethyl hexyl ketones, $C_2H_5COC_6H_{13}$; ethyl heptyl ketones, $$C_2H_5COC_7H_{15}$$

dipropyl ketones, $C_3H_7COC_3H_7$; propyl butyl ketones, $C_3H_7COC_4H_9$; propyl pentyl ketones, $$C_3H_7COC_5H_{11}$$

propyl hexyl ketones, $C_3H_7COC_6H_{13}$; dibutyl ketones, $C_4H_9COC_4H_9$; butyl pentyl ketones, $$C_4H_9COC_5H_{11}$$

dipentyl ketones, $C_5H_{11}COC_5H_{11}$; methyl cyclohexyl ketone, $CH_3COC_6H_{11}$; ethyl cyclohexyl ketone, $C_2H_5COC_6H_{11}$; propyl cyclohexyl ketones, $C_2H_5COC_6H_{11}$; cyclohexyl acetone, $$C_6H_{11}CH_2COCH_3$$

cyclohexanone, $C_6H_{10}O$; methyl cyclohexanones, $CH_3C_6H_9O$; ethyl cyclohexanones, $C_2H_5C_6H_9O$; propyl cyclohexanones, $C_3H_7C_6H_9O$; butyl cyclohexanones, $C_4H_9C_6H_9O$; acetophenone, $$C_6H_5COCH_3$$

tolyl methyl ketones, $CH_3C_6H_4COCH_3$; benzyl methyl ketone, $C_6H_5CH_2COCH_3$; acetylacetone, $CH_3COCH_2COCH_3$.

In carrying out the reaction, an enol ester starting material, as illustrated above, is mixed with the alkoxycarboxylic anhydride and the mixture reacted in the presence of a suitable esterification catalyst. In general the reaction temperature can be from 40° to 275° C., depending upon the particular enol ester and anhydride employed. Within this range, the more useful temperatures seem to be from about 80° to 175° C., which are preferred. The reaction can be conducted either in the liquid phase or in the vapor phase, in the presence of the catalyst. It can be carried out at normal atmospheric pressure, or at higher or lower pressure, as may be found desirable. In carrying out the liquid phase process the reaction mixture is allowed to stand for a suitable period or it can be heated and maintained at its refluxing temperature for a suitable period. Usually a reaction period of about one to five hours will be found suitable where the reaction is carried out at the refluxing temperature.

Starting with isopropenyl acetate and beta-ethoxypropionic anhydride, by way of illustration, it will be seen from the general equation given above that the ethoxypropionyl group displaces the acetyl group with consequent formation of isopropenyl beta-ethoxypropionate and the mixed anhydride of acetic and ethoxypropionic acids. It will be apparent also that as the reaction proceeds the concentrations of the enol ester and acid anhydride starting materials in the reaction mixture decrease from their initial concentrations while the concentrations of the isopropenyl beta-ethoxypropionate and the mixed anhydride products increase from their initial concentrations which is zero. In the presence of the catalyst, the enol beta-ethoxypropionic ester product and the mixed anhydride product will also react to form the starting material.

As far as is known the reactions taking place in the reaction mixture do not depart from well-established laws or principles applicable to opposing reactions, dynamic equilibria, and equilibrium concentrations. Thus, the position of the equilibrium may be shifted in the direction of the formation of the alkoxycarboxylic ester product by well-known expedients which are not a part of the invention, as for instance, by increasing the concentration of one of the reactants or by decreasing the concentration of one of the products.

Thus, instead of starting with equimolar proportions of the enol ester and the acid anhydride, either of them may be used in an amount greater than would be required, by theory, to react with all of the other. It will also be no less readily apparent that where one of the products boils at a temperature below that of either of the starting materials, it can be removed through an efficient column as it is formed.

The reaction is catalyzed with a strong acid such as, for instance, sulfuric acid, para-toluene sulfonic acid, phosphoric acid and the like, or a strongly electrophilic compound such as zinc chloride, aluminum chloride, boron trifluoride and others. Sulfuric acid is preferred, however. The quantity of catalyst can be varied between wide limits. About 0.5 per cent of the total weight of reactants will be found a convenient, effective amount but as little as 0.1 per cent or as much as 10 per cent may be used, if desired.

Inasmuch as the purpose of the catalyst is to accelerate the reaction between an enol ester and a carboxylic anhydride, it will be apparent that if the catalyst is destroyed in the mixture resulting from the reaction, a separation of the constituents can be effected, as by distillation, without tending to alter the position of equilibrium when one of the reactants boils at a lower temperature than the products, and would be removed first. Even without destroying the catalyst, however, the position of the equilibrium is not substantially displaced unless the distillation is unduly prolonged, relative to the time required for the reaction mixture to attain equilibrium.

I prefer, however, to neutralize the acid catalyst as with a tertiary amine or with sodium acetate, for instance, to minimize decomposition during distillation. If the catalyst is not destroyed, however, the initial distillation from the reaction mixture should be carried out as speedily as possible. For many purposes a separation of constituents by distillation under reduced pressure will be found very advantageous.

The invention is further disclosed and illustrated in the following example:

*Example*

A mixture of 1000 parts (10 mols) of isopropenyl acetate, 1090 parts (5 mols) of beta-ethoxypropionic anhydride, and 4.2 parts of concentrated sulfuric acid was heated under reflux for a period of three hours. The temperature of the reaction mixture under refluxing conditions was 115° C. The catalyst was then neutralized with 14 parts of anhydrous sodium acetate, and the mixture then distilled rapidly without separation of its constituents for the purpose of separating it quickly from salts and resinous by-products. Subsequent fractionation of the distillate under reduced pressure gave 470 parts of isopropenyl beta-ethoxypropionate, which is colorless liquid boiling at 66° C. at a pressure of 9 millimeters of mercury and having a refractive index ($n_D^{30}$) of 1.4187. The yield was 30 per cent of the theoretical. The efficiency based on the isopropenyl acetate was 73 per cent, and that based on the beta-ethoxypropionic anhydride was 70%.

This application is, in part, a continuation of my copending application filed October 5, 1945, Serial No. 620,623, now Patent No. 2,466,738.

What is claimed is:

1. A process which comprises forming a mixture of an alkoxy monocarboxylic acid anhydride having the characteristic anhydride structure, —O=C—O—C=O—, and containing not more than ten carbon atoms to the alkoxy-acyl group, with at least two of said carbon atoms being in the acyl group thereof, and an enol ester which is a saturated aliphatic carboxylic ester of the enol form of a ketone, said enol ester having the characteristics structure,

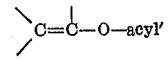

in which the enolic carbon atom has two carbon atoms attached directly thereto; said anhydride and said enol ester each being composed of carbon, hydrogen and oxygen with the oxygen in linkage only to carbon; and heating said mixture at its reaction temperature in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

2. A process which comprises forming a mixture of an alkoxy monocarboxylic acid anhydride having the characteristic anhydride structure, —O=C—O—C=O—, and containing not more than ten carbon atoms to the alkoxy-acyl group, with at least two of said carbon atoms being in the acyl group thereof, and an enol ester which is a saturated aliphatic carboxylic ester of the enol form of a ketone, said enol ester having the characteristic structure,

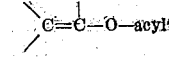

in which the enolic carbon atom has two carbon atoms attached directly thereto, said anhydride and said enol ester each being composed of carbon, hydrogen and oxygen with the oxygen in linkage only to carbon; and heating said mixture at a temperature of 40° to 275° C. in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

3. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol ester which is a saturated aliphatic carboxylic ester of the enol form of a ketone, said enol ester having the characteristic structure,

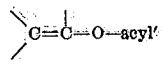

in which the enolic carbon atom has two carbon atoms attached directly thereto, said anhydride and said enol ester each being composed of carbon, hydrogen and oxygen with the oxygen in linkage only to carbon; and heating said mixture at a temperature of 80° to 175° C. in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

4. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol ester which is a saturated aliphatic carboxylic ester of the enol form of an aliphatic ketone, said enol ester being of the characteristic structure,

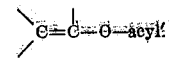

in which both the acyl' oxy group and the enol alcohol radical joined thereto are aliphatic and contain not more than ten carbon atoms each with the enolic carbon atom having two carbon atoms attached directly thereto, said anhydride and said enol ester each being composed of carbon, hydrogen and oxygen with the oxygen in linkage only to carbon; and heating said mixture at its reaction temperature in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

5. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol ester which is a saturated aliphatic carboxylic ester of the enol form of an aliphatic ketone, said enol ester being of the characteristic structure,

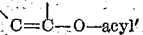

in which both the acyl' oxy group and the enol alcohol radical joined thereto are aliphatic and contain not more than ten carbon atoms each with the enolic carbon atom having two carbon atoms attached directly thereto, said anhydride and said enol ester each being composed of carbon, hydrogen and oxygen with the oxygen in linkage only to carbon; and heating said mixture at a temperature of 40° to 275° C. in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

6. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol ester which is a saturated aliphatic carboxylic ester of the enol form of an aliphatic ketone, said enol ester being of the characteristic structure,

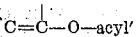

in which both the acyl' oxy group and the enol alcohol radical joined thereto are aliphatic and contain not more than ten carbon atoms each with the enolic carbon atom having two carbon atoms attached directly thereto, said anhydride and said enol ester each being composed of carbon, hydrogen and oxygen with the oxygen in linkage only to carbon; and heating said mixture at a temperature of 80° to 175° C. in the presence of an esterification catalyst to form another enol ester differing from said first enol ester in the acyl group thereof which is the same as the acyl group of the alkoxy monocarboxylic acid anhydride, the enol alcohol radicals of both of said enol esters being the same.

7. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol acetate of the characteristic enol ester structure,

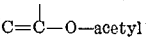

in which the enol alcohol radical joined to the acetoxy group is aliphatic and contains not more than ten carbon atoms with the enolic carbon atom having two carbon atoms attached directly thereto, said anhydride and said enol ester being composed of carbon, hydrogen and oxygen with the oxygen in linkage only to carbon; and heating said mixture at a temperature of 40° to 275° C. in the presence of an esterification catalyst to form another enol ester differing from the enol acetate in the acyl group thereof which is the same as the acyl group of the alkoxy monocarboxylic acid anhydride, the enol alcohol radicals of both said enol acetate and said enol ester being the same.

8. A process which comprises forming a mixture of an alkoxy monocarboxylic acid anhydride having the characteristic anhydride structure, —O=C—O—C=O—, and containing not more than ten carbon atoms to the alkoxyacyl group, with at least two of said carbon atoms being in the acyl group thereof, and an enol acetate of the characteristic enol ester structure,

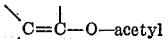

in which the enol alcohol radical joined to the acetoxy group is aliphatic and contains not more than ten carbon atoms with the enolic carbon atom having two carbon atoms attached directly thereto, said anhydride and said enol ester being composed of carbon, hydrogen and oxygen with the oxygen in linkage only to carbon; and heating said mixture at a temperature of 80° to 175° C. in the presence of an esterification catalyst to form another enol ester differing from the enol acetate in the acyl group thereof which is the same as the acyl group of the alkoxy monocarboxylic acid anhydride, the enol alcohol radicals of both said enol acetate and said enol ester being the same.

9. A process which comprises forming a mixture of a beta-alkoxypropionic anhydride containing not more than ten carbon atoms to the alkoxypropionyl group and an enol acetate of the characteristic structure,

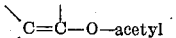

in which the enol alcohol radical joined to the acetyloxy group is aliphatic and contains not more than ten carbon atoms with the enolic carbon atom having two carbon atoms attached directly thereto, said anhydride and said enol ester being composed of carbon, hydrogen and oxygen with the oxygen in linkage only to carbon; and heating said mixture at a temperature of 40° to 275° C. in the presence of an esterification catalyst to form an enol alkoxypropionate in which the alkoxypropionyl group is the same as that of the anhydride and the enol alcohol radical is the same as that of the enol acetate.

10. A process which comprises forming a mixture of beta-ethoxypropionic anhydride and an aliphatic enol acetate of the characteristic structure,

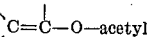

in which the enol alcohol radical joined to the acetoxy group is composed of carbon and hydrogen with the enolic carbon atom having two carbon atoms attached directly thereto; and heating said mixture to a temperature of 40° to 275° C. in the presence of an esterification catalyst to form an enol beta-ethoxypropionate in which the enol alcohol radical is the same as that of the enol acetate and contains not more than ten carbon atoms.

11. A process which comprises forming a mixture of beta-methoxypropionic anhydride and an aliphatic enol acetate of the characteristic structure, >C=C—O—acetyl, in which the enol alcohol radical joined to the acetoxy group is composed of carbon and hydrogen with the enolic carbon atom having two carbon atoms attached directly thereto; and heating said mixture to a temperature of 40° to 275° C. in the presence of an esterification catalyst to form an enol beta-methoxypropionate in which the enol alcohol radical is the same as that of the enol acetate and contains not more than ten carbon atoms.

12. A process which comprises forming a mixture of beta-alkoxypropionic anhydride having not more than ten carbon atoms to the alkoxypropionyl group and isopropenyl acetate, and heating said mixture at a temperature of 40° to 275° C. in the presence of an esterification catalyst to form isoprepenyl beta-alkoxypropionate in which the beta-alkoxypropionyl group is the same as that of the anhydride.

13. A process of making isopropenyl beta-ethoxypropionate which comprises heating a mixture of beta-ethoxypropionic anhydride and isopropenyl acetate at a temperature of 40° to 275° C. in the presence of an esterification catalyst.

14. A process of making isopropenyl beta-methoxypropionate which comprises heating a mixture of beta-methoxypropionic anhydride and isopropenyl acetate at a temperature of 40° to 275° C. in the presence of an esterification catalyst.

BENJAMIN PHILLIPS, Jr.

REFERENCES CITED

The following references are of record in the file of this patent:

UNITED STATES PATENTS

| Number | Name | Date |
|---|---|---|
| 2,448,246 | Barker | Aug. 31, 1948 |
| 2,466,738 | Phillips | Apr. 12, 1949 |